(12) United States Patent
Bonilla et al.

(10) Patent No.: US 7,587,421 B2
(45) Date of Patent: Sep. 8, 2009

(54) METHOD, SYSTEM, AND ARTICLE OF MANUFACTURE FOR GENERATING DEVICE SPECIFIC REQUESTS

(75) Inventors: Sergio P. Bonilla, San Jose, CA (US);
Hai-Yann Hwang, San Jose, CA (US);
Karsten Jancke, Frankfurt (DE);
Thorsten Schaefer, Mainz (DE); Xin Wang, San Jose, CA (US); Cindy Zhou, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 502 days.

(21) Appl. No.: 10/769,684

(22) Filed: Jan. 30, 2004

(65) Prior Publication Data
US 2005/0171953 A1 Aug. 4, 2005

(51) Int. Cl.
*G06F 17/00* (2006.01)
(52) U.S. Cl. .................. 707/104.1; 707/5; 707/10; 707/100
(58) Field of Classification Search .......... 707/104.1, 707/100, 10, 1, 5, 3
See application file for complete search history.

(56) References Cited

U.S. PATENT DOCUMENTS

| | | | |
|---|---|---|---|
| 4,855,905 A | | 8/1989 | Estrada et al. |
| 5,313,633 A | * | 5/1994 | Tomita et al. ............. 707/1 |
| 5,560,013 A | | 9/1996 | Scalzi et al. |
| 5,625,767 A | * | 4/1997 | Bartell et al. ............. 345/440 |
| 5,809,028 A | | 9/1998 | Nethercott et al. |
| 5,822,580 A | * | 10/1998 | Leung ................. 707/103 R |
| 5,864,870 A | * | 1/1999 | Guck ..................... 707/104.1 |
| 5,961,582 A | | 10/1999 | Gaines |
| 6,021,484 A | | 2/2000 | Park |
| 6,065,040 A | | 5/2000 | Mima et al. |
| 6,085,198 A | | 7/2000 | Skinner et al. |
| 6,122,691 A | | 9/2000 | Arimilli et al. |
| 6,131,121 A | | 10/2000 | Mattaway et al. |

(Continued)

FOREIGN PATENT DOCUMENTS

EP 1 061 441 12/2000

(Continued)

OTHER PUBLICATIONS

Distributed Management Task Force, Inc. "Common Information Model (CIM) Core Model", Status: Final, Version 2.4, Aug. 30, 2000, pp. 1-54.

(Continued)

*Primary Examiner*—Hosain T Alam
*Assistant Examiner*—Leon Harper
(74) *Attorney, Agent, or Firm*—Rabindranath Dutta; Konrad Raynes & Victor LLP

(57) ABSTRACT

Provided are a method, system and article of manufacture for managing devices, wherein in certain embodiments a request implemented via at least one device independent class is received. A class hierarchy database is traversed to determine at least one device specific class that corresponds to the at least one device independent class, wherein the class hierarchy database stores a class hierarchy and associations between classes. The received request is modified, wherein in the modified request the least one device independent class has been translated to the at least one device specific class.

33 Claims, 10 Drawing Sheets

U.S. PATENT DOCUMENTS

| | | | | |
|---|---|---|---|---|
| 6,141,714 | A * | 10/2000 | Arimilli et al. | 710/107 |
| 6,145,014 | A | 11/2000 | Chong | |
| 6,208,994 | B1 * | 3/2001 | Abdelnur | 707/103 R |
| 6,226,649 | B1 | 5/2001 | Bodamer et al. | |
| 6,295,532 | B1 * | 9/2001 | Hawkinson | 707/4 |
| 6,317,748 | B1 * | 11/2001 | Menzies et al. | 707/103 X |
| 6,327,594 | B1 | 12/2001 | Van Huben et al. | |
| 6,327,627 | B1 | 12/2001 | Orton et al. | |
| 6,370,592 | B1 | 4/2002 | Kumpf | |
| 6,389,129 | B1 | 5/2002 | Cowan | |
| 6,470,354 | B1 | 10/2002 | Aldridge et al. | |
| 6,480,955 | B1 | 11/2002 | DeKoning et al. | |
| 6,484,177 | B1 | 11/2002 | Van Huben et al. | |
| 6,493,719 | B1 | 12/2002 | Booth et al. | |
| 6,711,617 | B1 | 3/2004 | Bantz et al. | |
| 6,839,717 | B1 * | 1/2005 | Motoyama et al. | 707/104.1 |
| 6,862,736 | B2 * | 3/2005 | Hudis et al. | 719/316 |
| 6,961,730 | B2 * | 11/2005 | Kagalwala et al. | 707/102 |
| 7,054,853 | B2 * | 5/2006 | Johnson et al. | 707/2 |
| 7,085,839 | B1 | 8/2006 | Baugher et al. | |
| 7,111,018 | B1 * | 9/2006 | Goodrich et al. | 707/104.1 |
| 7,143,156 | B2 * | 11/2006 | Menzies et al. | 709/223 |
| 7,165,104 | B2 * | 1/2007 | Wang | 709/224 |
| 7,412,436 | B2 * | 8/2008 | Trappen et al. | 707/3 |
| 7,478,409 | B2 * | 1/2009 | Scian et al. | 719/328 |
| 2001/0056504 | A1 | 12/2001 | Kuznetsov | |
| 2002/0007360 | A1 * | 1/2002 | Hawkinson | 707/4 |
| 2002/0091809 | A1 * | 7/2002 | Menzies et al. | 709/223 |
| 2002/0107872 | A1 * | 8/2002 | Hudis et al. | 707/104.1 |
| 2002/0108102 | A1 | 8/2002 | Muhlestein et al. | |
| 2002/0112038 | A1 | 8/2002 | Hessmer et al. | |
| 2002/0156790 | A1 * | 10/2002 | Kagalwala et al. | 707/100 |
| 2002/0178253 | A1 | 11/2002 | Sedlack | |
| 2002/0199022 | A1 | 12/2002 | Tsang et al. | |
| 2003/0004956 | A1 * | 1/2003 | Johnson et al. | 707/100 |
| 2003/0055862 | A1 | 3/2003 | Bhat | |
| 2003/0172088 | A1 * | 9/2003 | Mandal et al. | 707/200 |
| 2004/0015470 | A1 * | 1/2004 | Smith et al. | 707/1 |
| 2004/0015489 | A1 * | 1/2004 | Anonsen et al. | 707/3 |
| 2004/0015496 | A1 * | 1/2004 | Anonsen | 707/4 |
| 2004/0015506 | A1 * | 1/2004 | Anonsen et al. | 707/100 |
| 2004/0024483 | A1 | 2/2004 | Holcombe | |
| 2004/0039745 | A1 * | 2/2004 | Evans et al. | 707/100 |
| 2004/0088347 | A1 | 5/2004 | Yeager et al. | |
| 2004/0117350 | A1 * | 6/2004 | Cavage et al. | 707/2 |
| 2004/0133640 | A1 | 7/2004 | Yeager et al. | |
| 2004/0172382 | A1 * | 9/2004 | Prang et al. | 707/2 |
| 2004/0260706 | A1 * | 12/2004 | Anonsen et al. | 707/100 |
| 2005/0172258 | A1 | 8/2005 | Nixon et al. | |

FOREIGN PATENT DOCUMENTS

| | | |
|---|---|---|
| EP | 1 061 445 A2 | 12/2000 |
| GB | 2 330 671 | 9/1998 |
| GB | 2 368 684 A | 8/2002 |
| JP | 2001184324 | 7/2001 |
| JP | 2002157172 | 5/2002 |
| TW | 484066 | 4/2002 |
| TW | 505865 | 10/2002 |

OTHER PUBLICATIONS

Distributed Management Task Force, Inc. "Device Storage Model White Paper", Status: Preliminary, Version 0.3, © 2000-2002 DMTF, pp. 1-37.

Distributed Management Task Force, Inc. "Specifications for CIM Operations over HTTP", Status: Preliminary, Version 1.1, May 2, 2002, pp. 1-88.

Gentry, Jr., M.L., N.S. Lenz, D.F. Obermann and V.S. Umamaheswaran. "Generic Code Page Conversion Application Program Interface", *IBM Technical Disclosure Bulletin*, vol. 34, No. 12, May 1992, pp. 421-430.

IBM Corporation, "Methods and System for Dynamically Associating Multiple Globally Unique Identifiers with a Software Application's Managed Set of Objects Using a Common Registry", *IBM Research Disclosure*, No. 436166, Aug. 200, p. 1475.

U.S. Appl. No. 10/371,336, filed Feb. 20, 2003, entitled "Method, System, and Program for Managing Systems in a Network", by H. Hwang, K. Jancke, T. Schaefer, S. P. Bonilla, X. Wang, & C. Zhou.

PCT International Search Report, PCT/EP2005/050041 filed Jun. 1, 2005.

PCT Written Opinion, PCT/EP2005/050041 filed Jun. 1, 2005.

C. Calvert, "Delphi 4 Unleashed. Chapter 3. Polymorphism", SAMS Publishing, Nov. 1998, XP002330120, pp. 1-23.

* cited by examiner

METHOD, SYSTEM, AND ARTICLE OF MANUFACTURE FOR GENERATING DEVICE SPECIFIC REQUESTS

BACKGROUND

1. Field

The disclosure relates to a method, apparatus, system, and article of manufacture for generating device specific requests.

2. Background

The Common Information Model (CIM) is an industry standard specification to allow for the interchange of management information in a network environment including devices from different vendors, where the network may include heterogenous as well as homogeneous devices. The CIM schema specifies a set of classes, including methods and objects, that management programs call to obtain information and perform management operations with respect to devices in the network. Each vendor of a network device that is capable of interfacing in a CIM environment may provide a set of device specific APIs that implement the CIM classes. A vendor would provide a CIM Provider, which is a program module that maps CIM APIs or methods, as defined by the industry standard CIM model, to device specific APIs that may implement the functionality of a defined CIM API for the specific device. The term "CIM API" as used herein refers to any method, interface or function that is called to perform an operation defined within the CIM management schema.

The CIM schemas define a common set of models and semantics for the management of devices. Applications can be programmed against a known, consistent set of models. For programming such applications, there is a continued need in the art to provide device vendors improved techniques to develop CIMs that convert device independent CIM requests to device specific requests for managed devices.

SUMMARY OF THE DESCRIBED EMBODIMENTS

Provided are a method, system and article of manufacture for managing devices, wherein in certain embodiments a request implemented via at least one device independent class is received. A class hierarchy database is traversed to determine at least one device specific class that corresponds to the at least one device independent class, wherein the class hierarchy database stores a class hierarchy and associations between classes. The received request is modified, wherein in the modified request the least one device independent class has been translated to the at least one device specific class.

In certain additional embodiments, at least one device independent class attribute is mapped to at least one device specific class attribute in the modified request. At least one device independent property is mapped to at least one device specific property in the modified request. A device specific request is generated from the modified request, in response to mapping the at least one device independent class attribute and the at least one device independent property. The device specific request is sent to a managed device.

In further embodiments, the received request is further modified to include at least one association between device specific classes in the class hierarchy.

In yet additional embodiments, the received request indicates a source class and a requested class. A specific association is determined between a first device specific class that corresponds to the source class and a second device specific class that corresponds to the specific class, wherein the specific association corresponds to a managed device. In certain embodiments, the source class represents storage pools and the requested class represents storage volumes corresponding to a storage pool.

In still further embodiments, the received request indicates a source class and a base association. A first device specific class is determined from the class hierarchy database, wherein the first device specific class has a specific association with a second device specific class that corresponds to the indicated source class, and wherein the specific association corresponds to the base association.

In yet additional embodiments the receiving, traversing, and modifying are performed by a proxy. A device specific request is generated in a device specific language. The device specific request in the device specific language is sent to a managed device coupled to the proxy.

In additional embodiments, the request is received from a Common Information Model application, wherein the at least one device independent class is specified by a Common Information Model schema.

In further embodiments, the request comprises a command that is part of an object oriented management schema for managing non-homogeneous devices in a network environment. In certain embodiments the management schema comprises the Common Information Model.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1:
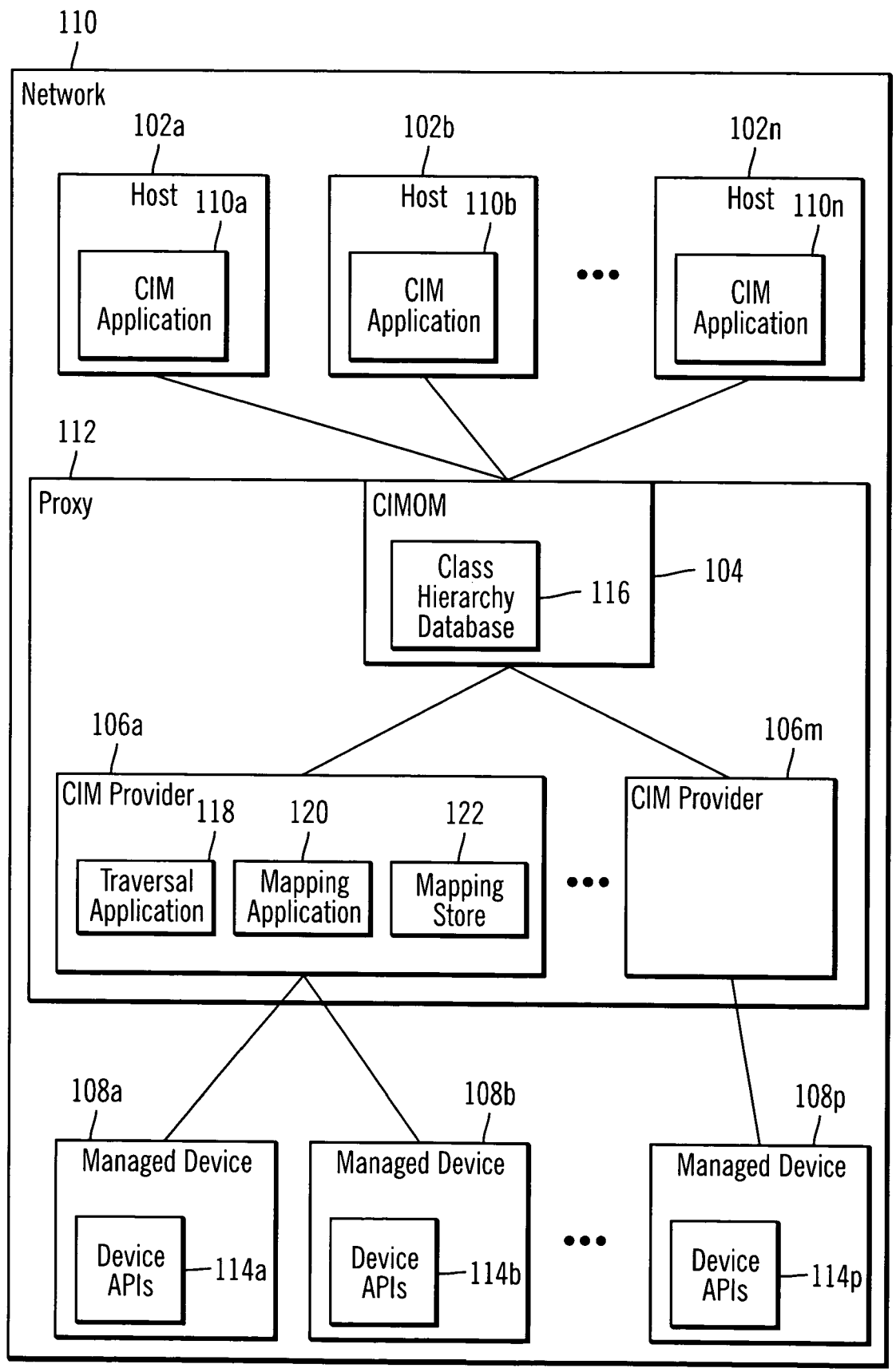
FIG. 1 illustrates a computing environment, in accordance with certain embodiments.

FIG. 1 illustrates a computing architecture in which aspects of the invention are implemented. A plurality of host systems 102a, 102b, . . . 102n, a CIM Object Manager (CIMOM) 104, CIM providers 106a . . . 106m, and managed devices 108a, 108b, . . . 108p communicate over a network 110. In certain embodiments the CIMOM 104 and the CIM providers 106a . . . 106m may be implemented in a proxy 112, where the proxy 112 may be a computational device. Each host 102a . . . 102n includes a CIM application 110a, 110b . . . 110n to generate and communicate CIM management requests comprised of CIM APIs to perform management operations with respect to the managed devices 108a . . . 108p. The CIMOM 104 receives CIM requests from the CIM applications 110a . . . 110n and transfers them to the CIM provider 106a . . . 106m associated with the managed device 108a . . . 108p to which the request is directed. Each managed device 108a . . . 108p implements device specific APIs 114a . . . 114p which perform management related operations, retrieving information, configuration, etc., on the device 108a . . . 108p. A device specific API, such as, device specific API 114a, that is implemented in a managed device, such as, managed device 108a, may use one or more device specific classes corresponding to the managed device.

The CIMOM 104 may include a class hierarchy database 116 that maps CIM classes, such as, standard or Distributed Management Task Force (DTMF) CIM classes, to device specific CIM classes by storing classes hierarchically. While in certain embodiments CIM classes may comprise standard or DTMF CIM classes, in alternative embodiments CIM classes may comprise other classes that are not device specific. For example, CIM classes may include device independent classes designed by an organization that is different from DTMF. A CIM provider, such as CIM provider 106a, may include a traversal application 118, a mapping application 120, and a mapping store 122. The traversal application 118 may traverse the class hierarchy database 116 to map CIM classes present in a request from a CIM application 110a . . . 110n to device specific CIM classes. The mapping application 120 may use the mapping store 122 to store a class hierarchy that contains CIM classes, such as, standard or DTMF CIM classes, and device specific CIM classes. In certain embodiments, the CIM classes are super-classes and the device specific classes are sub-classes or leaf-classes in the stored class hierarchy.

The CIM providers 106a. . . 106m are used to map CIM commands in CIM messages to device specific APIs 114a, 114b, . . . 114p capable of implementing the CIM command on the target managed device 108a . . . 108p. Further details of the CIM model are described in publications from the Distributed Management Task Force (DMTF), including "Common Information Model: Core Model", Version 2.4 (Aug. 30, 2000), which publication is incorporated herein by reference in its entirety.

The network 110 may comprise any network known in the art, such as a Local Area Network (LAN), Storage Area Network (SAN), Wide Area Network (WAN), the Internet, a wireless network, etc. Alternatively, the network 110 may comprise a bus interface. The hosts 102a . . . 102n may comprise any type of computational device capable of running a CIM application 110a . . . 110n, such as a workstation, desktop computer, server, laptop, mainframe, telephony device, hand held computer, etc. The proxy 112 may comprise any type of computational device capable of running the CIMOM 104 and the CIM providers 106a . . . 106m. In alternative embodiments, the CIM providers 106a . . . 106m may run on systems separate from the CIMOM 104 or run within the managed devices 108a . . . 108p. Further, one CIM provider 106a . . . 106m may manage CIM messages for one or more managed devices 108a . . . 108p. The managed device 108a . . . 108p may comprise any physical or logical device known in the art, such as a storage device, storage medium, storage media library, Fibre Channel, switch, fabric, database, etc., for which a separate CIM provider may be provided. There may be any number of hosts, CIMOMs, CIM providers, and managed devices, and embodiments are not limited to the configuration and arrangement of components shown in FIG. 1.

Figure 2:
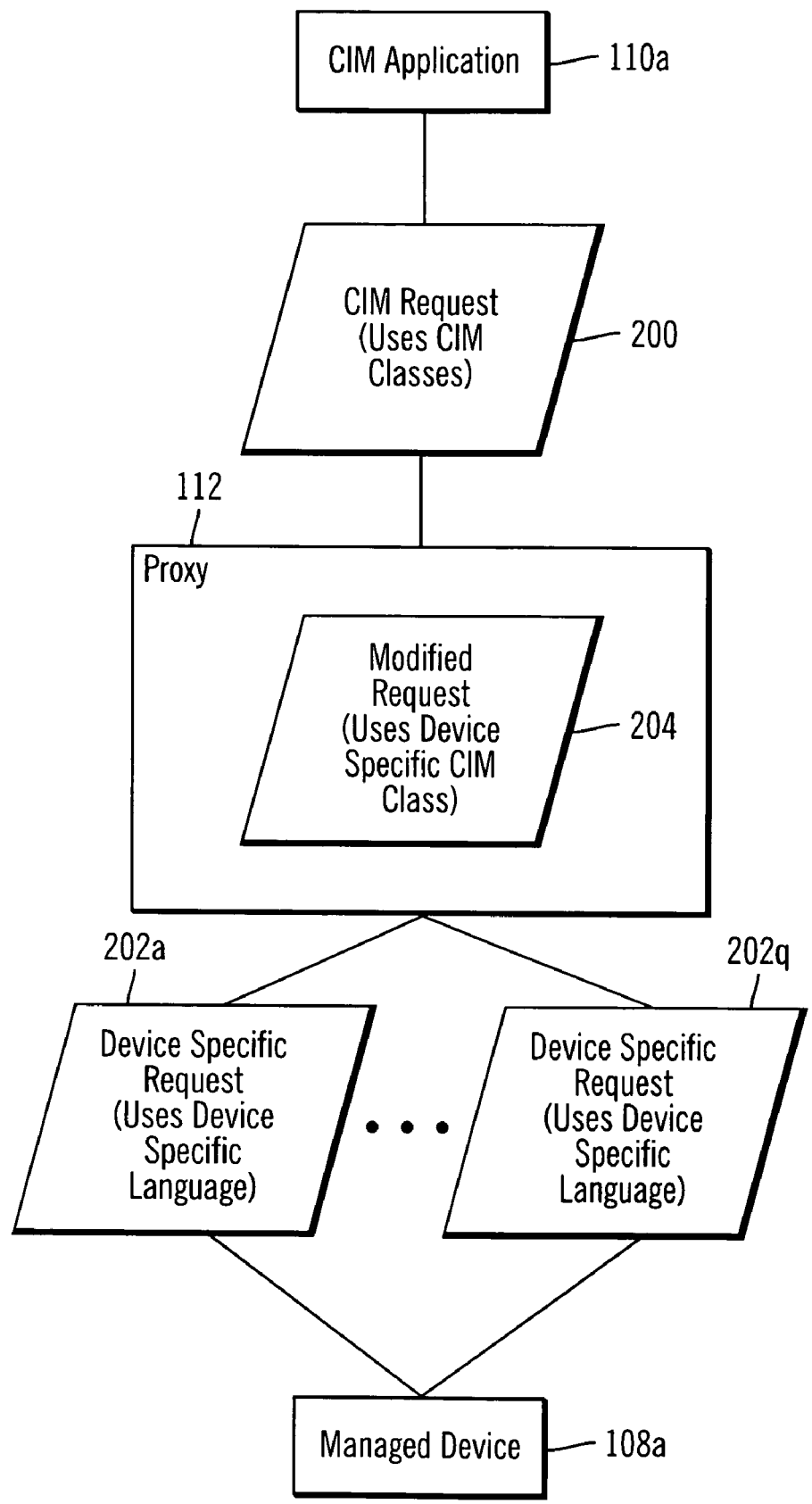
FIG. 2 illustrates how a CIM request is converted to a device specific request, in accordance with certain embodiments.

FIG. 2 illustrates how the proxy 112 converts a CIM request 200 into one or more device specific requests 202a . . . 202q, in accordance with certain embodiments. Device specific requests are implemented using device specific classes, i.e., a device specific request corresponding to a managed device can be executed in the managed device.

The proxy 112 receives a CIM request 200 that uses one or more CIM classes from a CIM application, such as, CIM application 110a that runs in the host 102a. In certain embodiments, the CIM request 200 is intended for the managed device 108a which is managed by the CIM provider 106a in the proxy 112. The proxy 112 modifies the CIM request 200 into at least one modified request 204 that uses one or more device specific CIM classes. The proxy 112 further converts the modified request 204 into one or more device specific requests 202a . . . 202q that uses device specific language and sends the one or more device specific requests 202a . . . 202q to a managed device, such as managed device 108a, whose device API 114a uses the device specific language.

Therefore, FIG. 2 illustrates an embodiment in which the proxy 112 converts a CIM request 200 received from a CIM Application 110a into one or more device specific requests 202a . . . 202q for the managed device 108a. The proxy 112 may convert CIM requests from other CIM applications into device specific requests for other managed devices.

Figure 3:
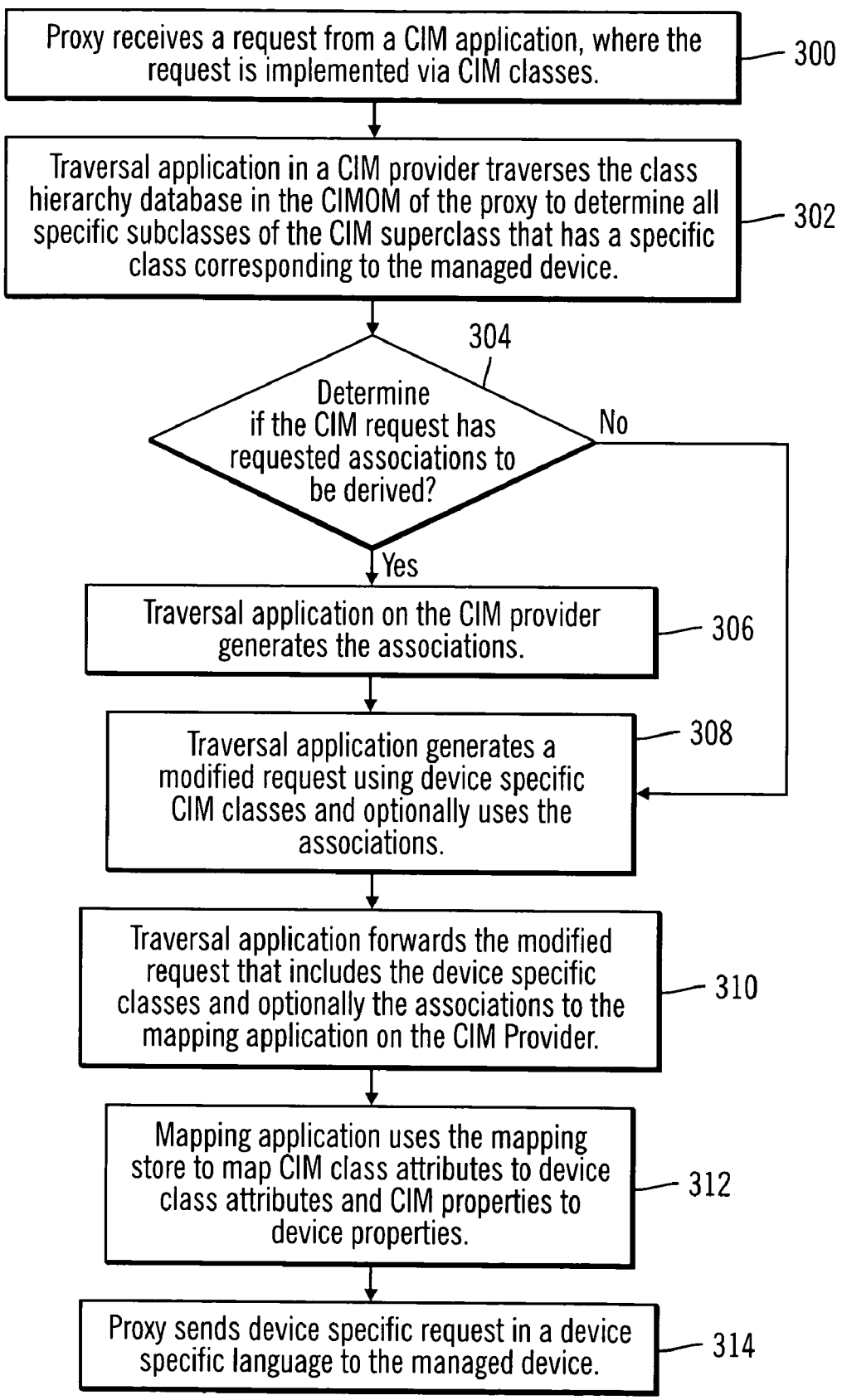
FIG. 3 illustrates logic to generate one or more device specific requests, in accordance with certain embodiments.

FIG. 3 illustrates logic implemented in the proxy 112 to generate one or more device specific requests 202a . . . 202q, in accordance with certain embodiments. In alternative embodiments, certain of the operations illustrated in FIG. 3 may be performed in a different order, modified or removed.

Control starts at block 300 where the proxy 112 receives a CIM request 200 from a CIM application, such as, CIM application 110a, where the CIM request 200 is implemented via CIM classes. In certain embodiments, the CIM request 200 is intended for the managed device 108a, where the managed device 108 is managed by the CIM provider 106a in the proxy 112. In other embodiments, the CIM request 200 may be intended for other managed devices that may be managed by other CIM providers.

The traversal application 118 in the CIM Provider 106a of the proxy 112 traverses the class hierarchy database 116 in the CIMOM 104 to determine (at block 302) all specific subclasses of the CIM superclass that has a specific class corresponding to the managed device for which the CIM requested is intended. The CIM superclass is the class from which all other CIM classes derive.

The traversal application 118 determines (at block 304) whether the CIM request 200 had requested associations between device specific CIM classes to be derived. In objected oriented terminology an association is a connection between two classes.

If the traversal application 118 determines that the CIM request 200 had requested associations between device specific classes to be derived, then the traversal application 118 on the CIM provider 106a generates (at block 306) the associations. The traversal application 118 generates (at block 308) the modified request 204 using device specific CIM classes and optionally uses the associations.

The traversal application 118 forwards (at block 310) the modified request 204 that includes the device specific classes and optionally the associations to the mapping application 120 in the CIM provider 106a. The mapping application 120 in the CIM provider 106a uses the mapping store 122 to map (at block 312) CIM class attributes to device class attributes and CIM properties to device properties to generate one or more device specific requests 202a . . . 202q. The mapping application 120 sends (at block 314) the one or more device specific requests 202a . . . 202q in the device specific language to the managed device 108a.

If the traversal application 118 determines (at block 304) that the CIM request 200 had not requested associations between device specific classes to be derived, then the traversal application 118 on the CIM provider 106a generates (at block 308) the modified request 204 using device specific CIM classes.

Therefore, the logic of FIG. 3 illustrates certain embodiments in which the CIM provider 106a converts the device independent CIM request 200 from the CIM application 110a into one or more device specific requests 202a . . . 202q for the managed device 8a.

FIGS. 4, 5, 6, 7 illustrate how device specific CIM classes and associations are generated from CIM classes by logic implemented in the proxy 112, in accordance with certain embodiments.

Figure 4:
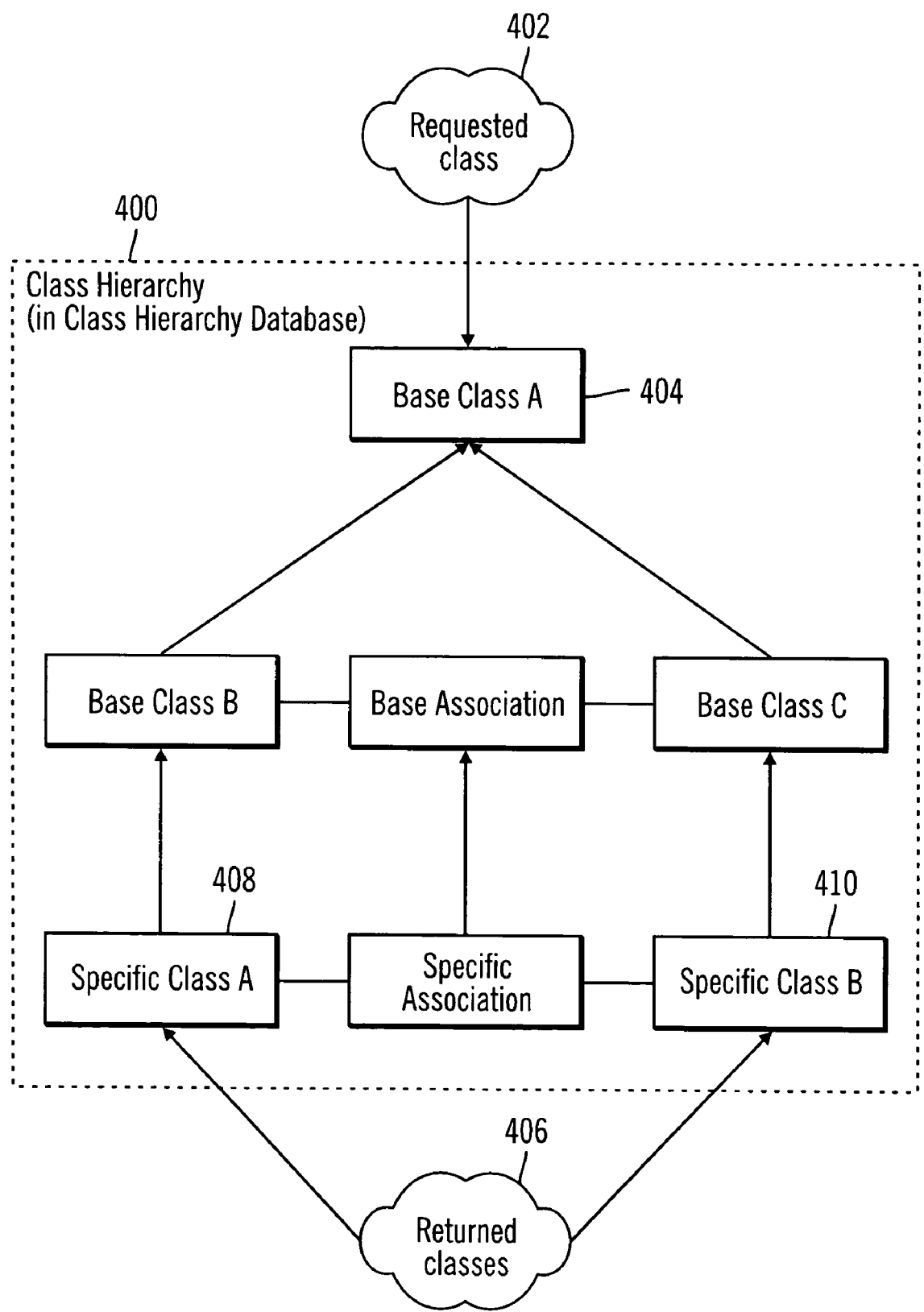
FIGS. 4, 5, 6, 7 illustrate how device specific CIM classes and associations are, generated from CIM classes, in accordance with certain embodiments.

FIG. 4 illustrates an embodiment in which a class hierarchy 400 is stored in the class hierarchy database 116. The bases classes and base associations are with respect to CIM classes and the specific classes and specific associations are with respect to the device specific CIM classes. In certain embodiments, if a requested class 402 from the traversal application 118 is the base class A 404, then in certain embodiments the corresponding returned classes 406 to the traversal application 118 from the class hierarchy database 116 may be the specific class A 408 and the specific class B 410.

Figure 5:
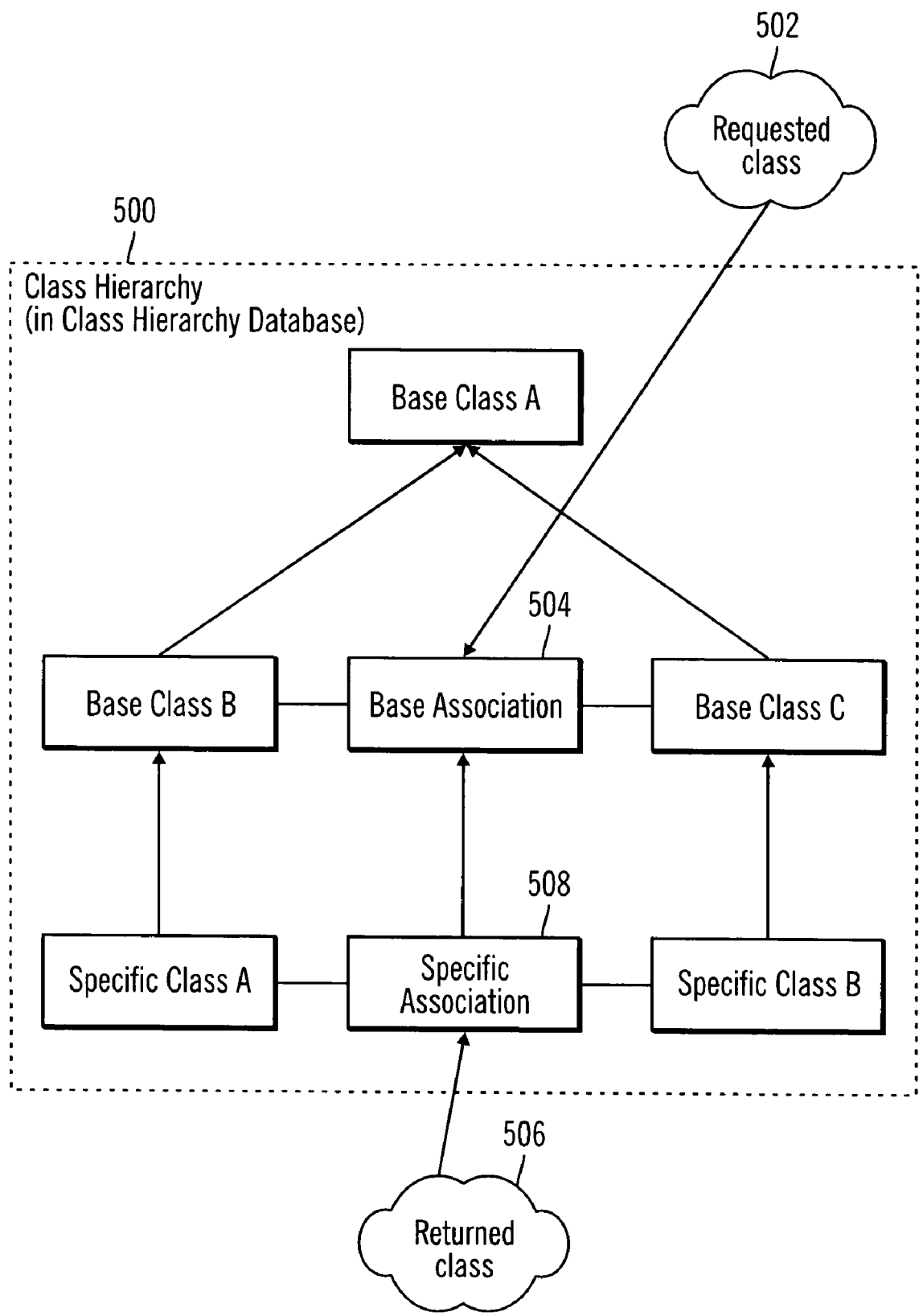

FIG. 5 illustrates an embodiment in which a class hierarchy 500 is stored in the class hierarchy database 116. The bases classes and base associations are with respect to CIM classes and the specific classes and specific associations are with respect to the device specific CIM classes. In certain embodiments if a requested class 502 from the traversal application 118 is the base association 504, then in certain embodiments the corresponding returned class 506 to the traversal application 118 from the class hierarchy database 116 may include the specific association 508.

Figure 6:
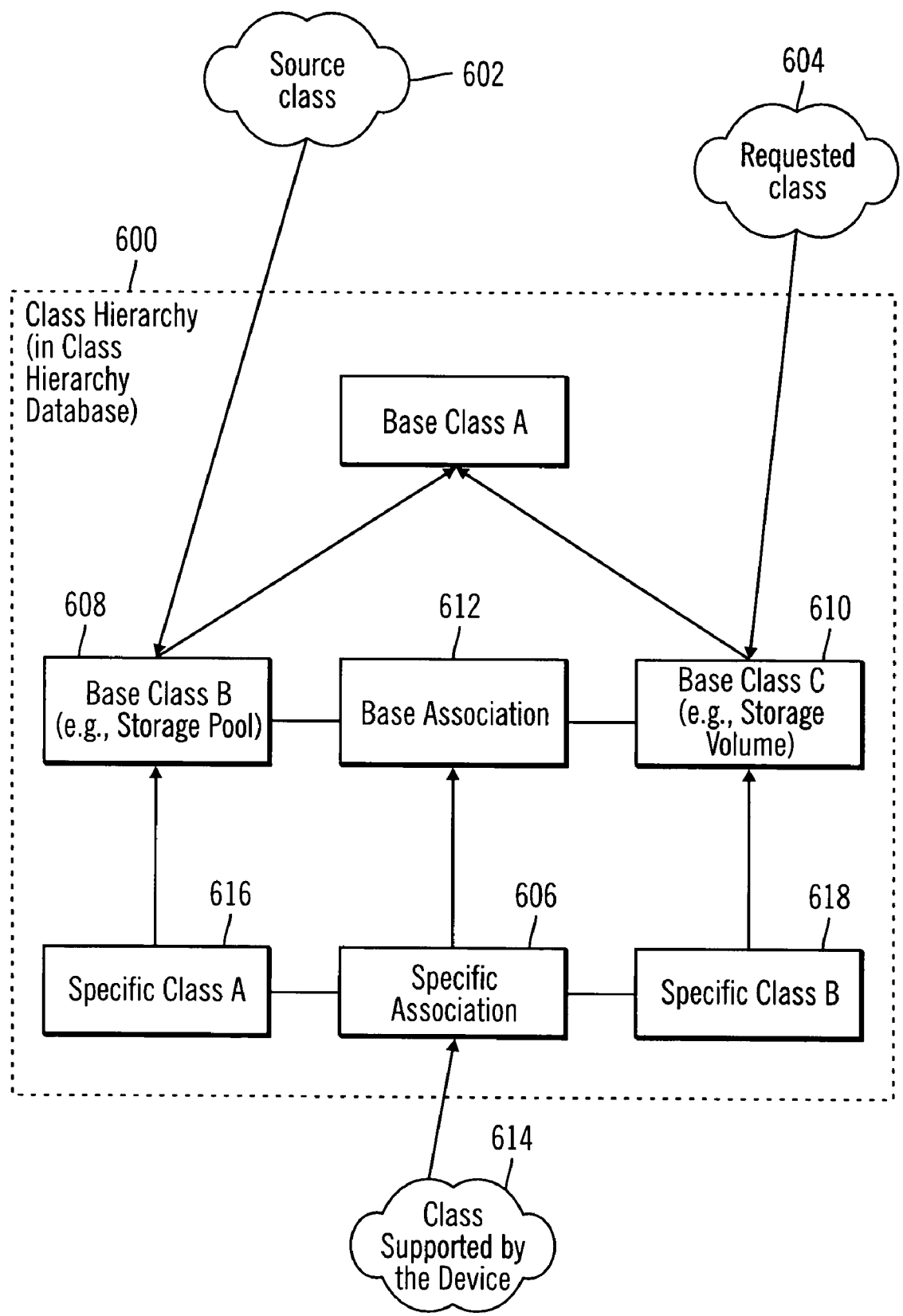

FIG. 6 illustrates an embodiment in which a class hierarchy 600 is stored in the class hierarchy database 116. The bases classes and base associations are with respect to CIM classes and the specific classes and specific associations are with respect to the device specific CIM classes. In certain embodiments if the traversal application 118 requests specific association instances by providing a source class 602 and a requested class 604, then the traversal application 118 may derive the class supported by the device 614 as the specific association 606. For example, in certain embodiments the base class B 608 may represent a storage pool and the base class C 610 may represent storage volumes in the storage pool, where the base association 612 connects the base class B 608 to the base class C 610. In certain embodiments, the traversal application 118 may determine the class supported by the device 614 from the class hierarchy 600, where the specific association 606 associates the specific class A 616 to the specific class B 618.

Figure 7:
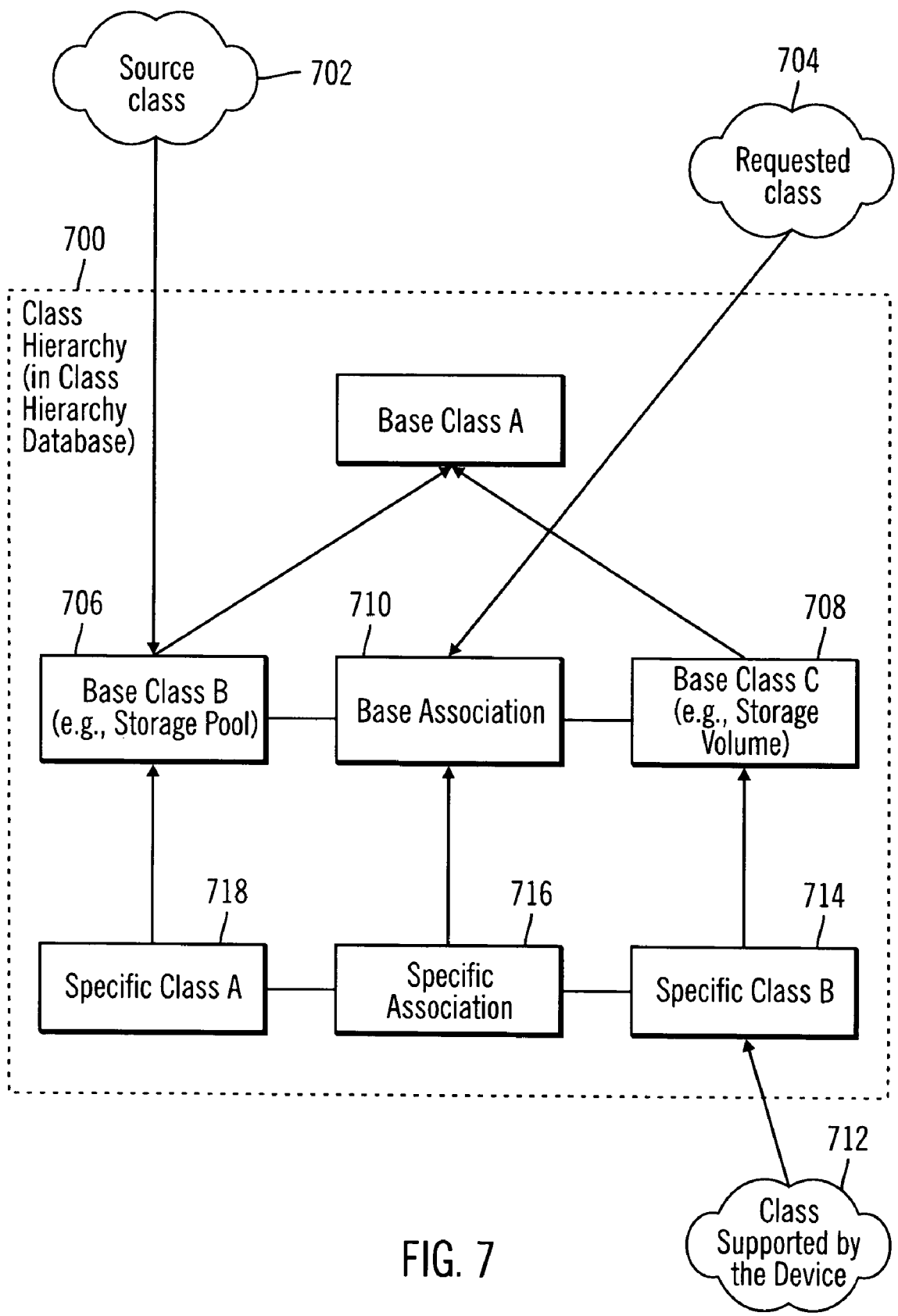

FIG. 7 illustrates an embodiment in which a class hierarchy 700 is stored in the class hierarchy database 116. The bases classes and base associations are with respect to CIM classes and the specific classes and specific associations are with respect to the device specific CIM classes. In certain embodiments, the traversal application 118 provides a source class 702 and requests the class hierarchy database 116 to provide the requested class 704 that corresponds to the class associated with the source class. For example, in certain embodiments the base class B 706 may represent a storage pool and the base class C 708 may represent storage volumes in the storage pool, where the base association 710 connects the base class B 706 to the base class C 708. In certain embodiments, the class hierarchy database 116 may return a class supported by the device 712 as the specific class B 714, where the specific association 716 associates the specific class 714 to the specific class 718 that corresponds to the base class B 706, i.e., the source class 702.

Therefore, FIGS. 4-7 illustrate how classes and associations may be derived by the traversal application 118 from the class hierarchy database 116.

Figure 8:
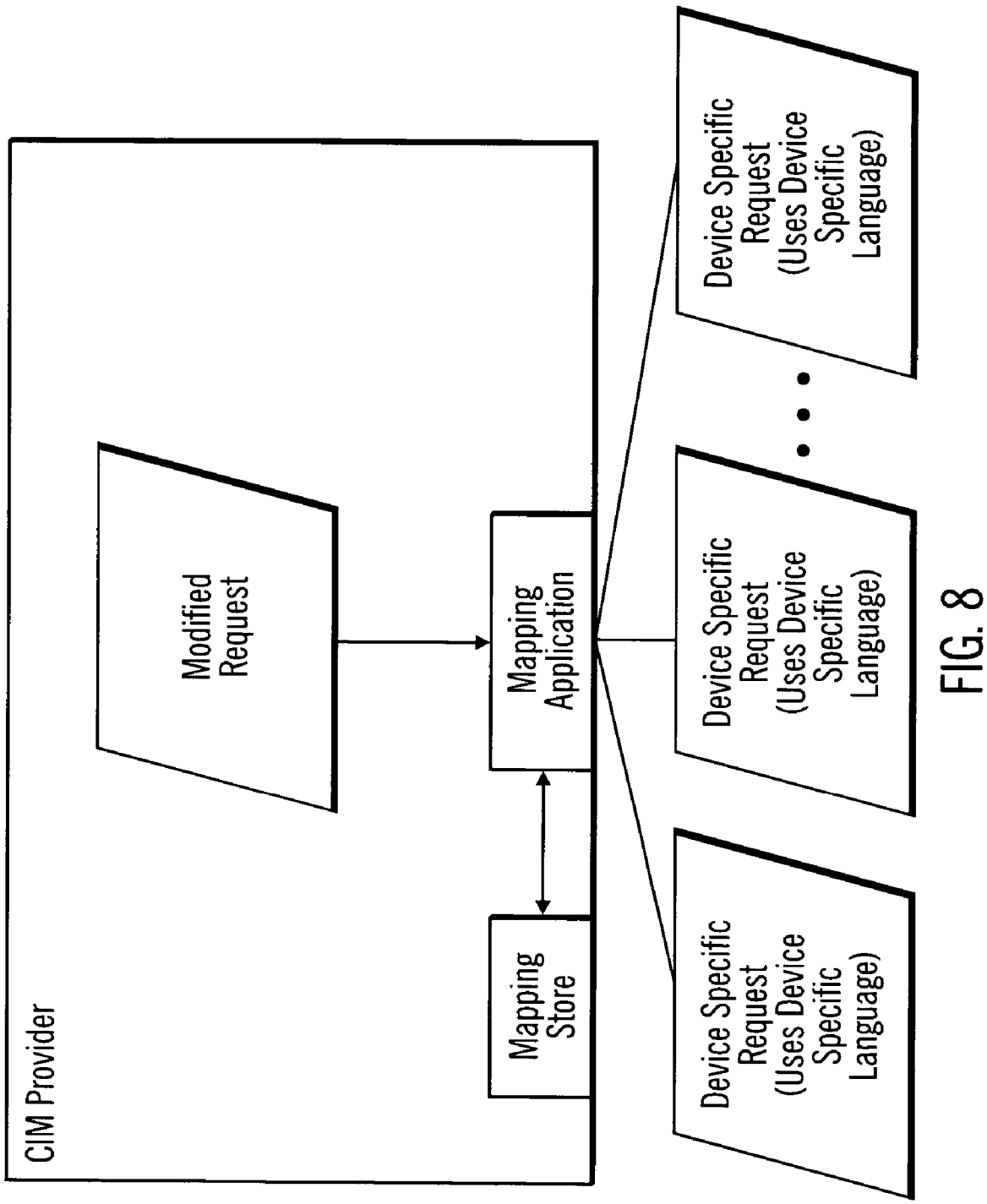
FIG. 8 illustrates how a mapping application generates device specific requests in a device specific language, in accordance with certain embodiments.

FIG. 8 illustrates how a mapping application, such as the mapping application 120, implemented in a CIM provider, such as, the CIM provider 106a, generates device specific requests 202a . . . 202q in a device specific language, in accordance with certain embodiments.

In certain embodiments, the mapping application 120 takes the modified request 204 generated by the traversal application 118 as input and in association with the mapping store 122 generates one or more device specific requests 202a . . . 202q, where the device specific requests 202a . . . 202q use device specific language corresponding to a device, such as, the managed device 108a, for which the modified request 204 is intended. The mapping store 222 includes mappings of CIM class attributes to device attributes and mappings of CIM properties to device properties. The device specific requests 202a . . . 202q are implemented in the device specific language and include the device attributes and the device properties.

For example, if the traversal application 118 generated the modified request 204 from the CIM request 200, then in certain embodiments the mapping application 220 may use the modified request 204 as input to generate the device specific requests 202a . . . 202q for the managed device 8a.

Figure 9:
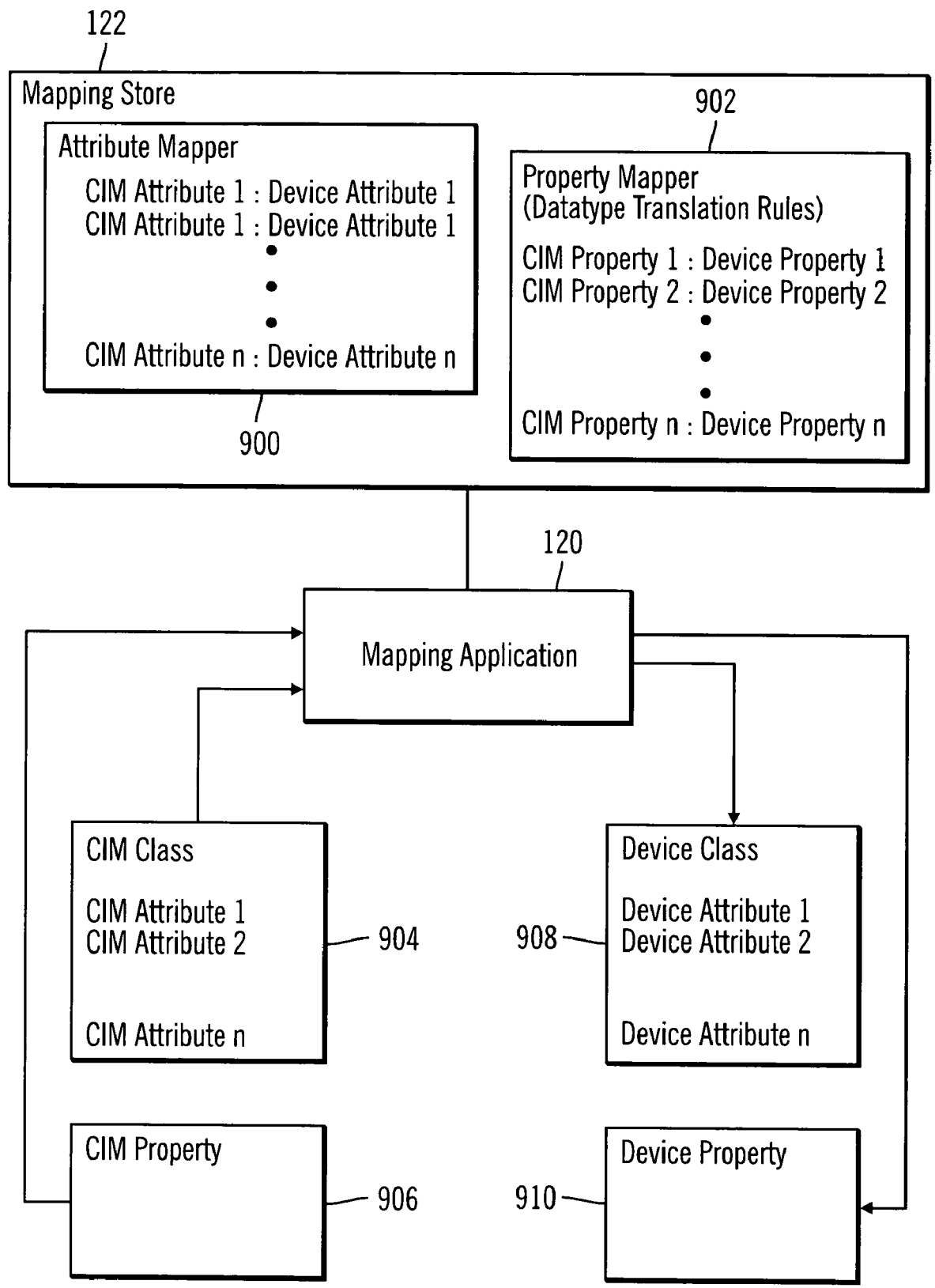
FIG. 9 illustrates how attributes and properties are mapped by the mapping application, in accordance with certain embodiments.

FIG. 9 illustrates how attributes and properties, such as, data types, are mapped by the mapping application 220 implemented in the CIM provider 106a in the proxy 112, in accordance with certain embodiments.

The mapping store 222 may include data structures corresponding to an attribute mapper 900 and a property mapper 902, such as, a mapper for data types. The attribute mapper 900 includes mappings between CIM attributes of an object and device attributes of the object. The property mapper 902 includes mappings between CIM properties of an object and device properties of an object. For example, in certain embodiments, the property mapper 902 may map data types.

In certain embodiments, the mapping application 220 may take a CIM class 904 with CIM property 906 and inputs and generate the device class 908 with the corresponding device property 910. The attributes of the CIM class 904 are mapped to the device attributes of the device class 908 from the attribute mapper 900 and the corresponding properties, such as, data types, are mapped by the property mapper 902.

Therefore, FIG. 9 illustrates how the mapping application 120 in a CIM provider in the proxy 112 generates device specific requests in a device specific language by mapping attributes and properties, such as, data types.

Certain embodiments inspect the CIM class definitions and a class hierarchy database and finds appropriate device specific CIM classes corresponding to device independent CIM classes. The class hierarchy database may be referred to as a dictionary and the dictionary may be configured to different types of class hierarchies and different types of devices. Certain embodiments also determine association between classes. Other embodiments provide additional generic techniques for the translation of device specific CIM classes to devices specific requests in a device specific language.

Additional Embodiment Details

The described techniques may be implemented as a method, apparatus or article of manufacture involving software, firmware, micro-code, hardware and/or any combination thereof. The term "article of manufacture" as used herein refers to program instructions, code and/or logic implemented in circuitry (e.g., an integrated circuit chip, Programmable Gate Array (PGA), ASIC, etc.) and/or a computer readable medium (e.g., magnetic storage medium, such as hard disk drive, floppy disk, tape), optical storage (e.g., CD-ROM, DVD-ROM, optical disk, etc.), volatile and non-volatile memory device (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments, and that the article of manufacture may comprise any information bearing medium known in the art. For example, the article of manufacture comprises a storage medium having stored therein instructions that when executed by a machine results in operations being performed.

Figure 10:
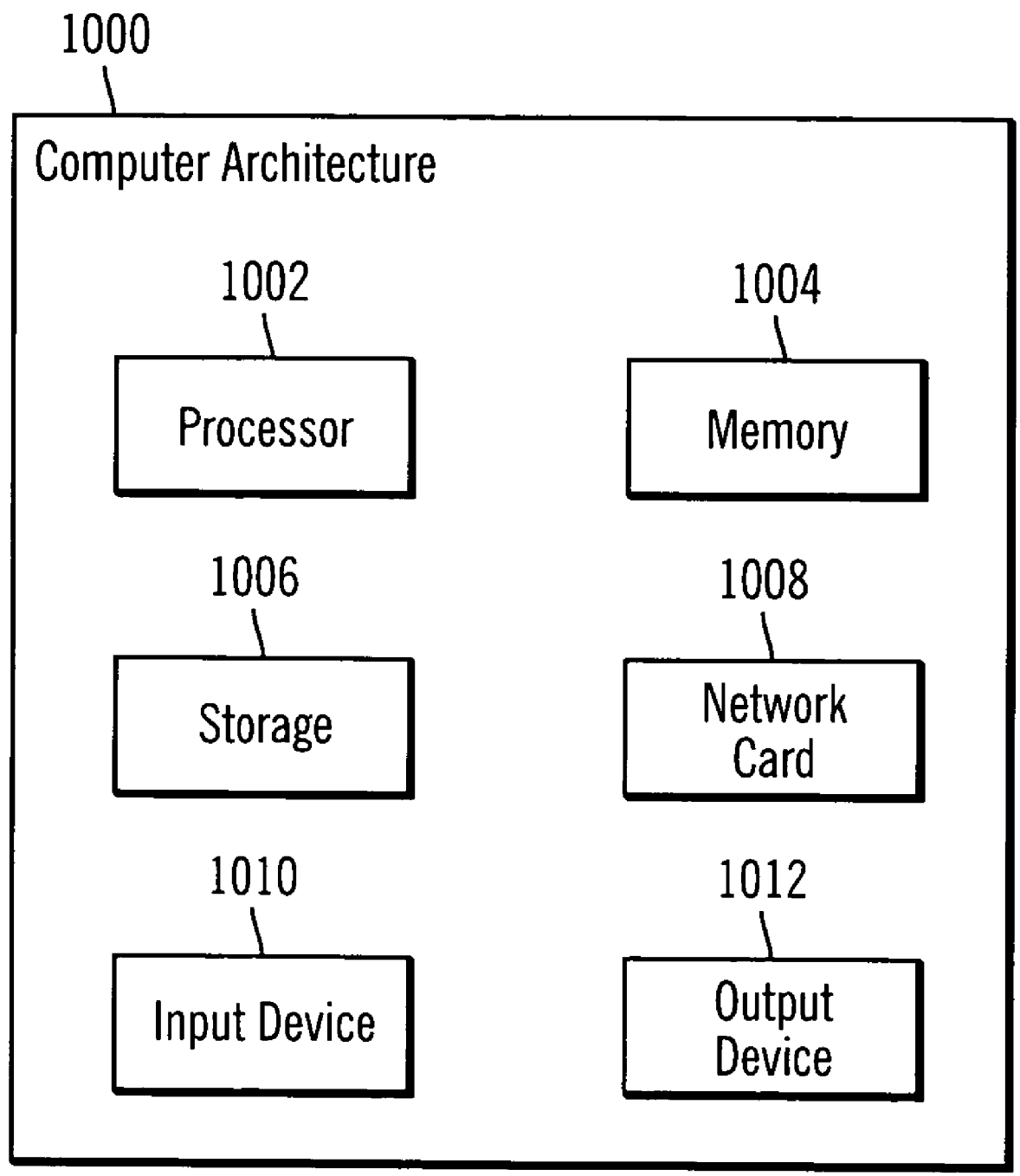
FIG. 10 illustrates a computing architecture in which certain embodiments are implemented.

FIG. 10 illustrates a block diagram of a computer architecture in which certain embodiments are implemented. FIG. 10 illustrates one embodiment of the hosts 102a . . . 102n, and the proxy 112 The hosts 102a . . . 102n and the proxy 112 may implement a computer architecture 1000 having a processor 1002, a memory 1004 (e.g., a volatile memory device), and storage 1006. Not all elements of the computer architecture 1000 may be found in the hosts 102a . . . 102n and the proxy 112. The storage 1006 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1006 may comprise an internal storage device, an attached storage device and/or a network accessible storage device. Programs in the storage 1006 may be loaded into the memory 1004 and executed by the processor 1002 in a manner known in the art. The architecture may further include a network card 1008 to enable communication with a network. The architecture may also include at least one input device 1010, such as a keyboard, a touchscreen, a pen, voice-activated input, etc., and at least one output device 1012, such as a display device, a speaker, a printer, etc.

At least certain of the operations of FIG. 3 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. For example, the traversal application 118 and the mapping application 120 could comprise a single application. Additionally, certain operations described as performed by a specific component may be performed by other components.

The data structures and components shown or referred to in FIGS. 1-10 are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method for managing devices, the method comprising:
receiving a request implemented via at least one device independent class;
traversing a class hierarchy database to determine at least one device specific class that corresponds to the at least one device independent class, wherein the class hierarchy database stores a class hierarchy and associations between classes;
modifying the received request, wherein in the modified request the least one device independent class has been translated to the at least one device specific class;
generating a device specific request in a device specific language; and
sending the device specific request in the device specific language to a managed device, wherein
(i) in the class hierarchy database, a first base class at a higher level in the class hierarchy is connected to a second base class and a third base class that are at a lower level in the class hierarchy, wherein the second and third base classes are connected via a base association;
(ii) in the class hierarchy database, the second base class is connected to a first specific class that corresponds to the first base class, the third base class is connected to a second specific class that corresponds to the second base class, wherein the first specific class and the second specific class are connected by a specific association;
(iii) in response to a request for specific association instances based on providing a source class corresponding to the second base class and a requested class corresponding to the third base class, deriving one class supported by the managed device via the specific association.

2. The method of claim 1, further comprising:
mapping at least one device independent class attribute to at least one device specific class attribute in the modified request;
mapping at least one device independent property to at least one device specific property in the modified request;
generating the device specific request from the modified request, in response to mapping the at least one device independent class attribute and the at least one device independent property; and
sending the device specific request to the managed device, wherein a proxy couples a plurality of hosts to a plurality of managed devices that includes the managed device.

3. The method of claim 1, further comprising:
further modifying the received request to include at least one association between device specific classes in the class hierarchy.

4. The method of claim 1, wherein the received request indicates the source class and the requested class, the method further comprising:
   determining one specific association between a first device specific class that corresponds to the source class and a second device specific class that corresponds to the specific class, wherein the one specific association corresponds to the managed device.

5. The method of claim 1, wherein the source class represents storage pools and the requested class represents storage volumes corresponding to a storage pool.

6. The method of claim 1, wherein the received request indicates the source class and the base association, the method further comprising:
   determining a first device specific class from the class hierarchy database, wherein the first device specific class has one specific association with a second device specific class that corresponds to the indicated source class, and wherein the one specific association corresponds to the base association.

7. The method of claim 1, wherein the request is received from a Common Information Model application, and wherein the at least one device independent class is specified by a Common Information Model schema.

8. The method of claim 1, wherein the request comprises a command that is part of an object oriented management schema for managing non-homogeneous devices in a network environment.

9. The method of claim 8, wherein the management schema comprises the Common Information Model.

10. The method of claim 1, wherein the managed device is coupled to a proxy, wherein the proxy is a computational device, and wherein the receiving, the traversing, the modifying and the generating are performed by the proxy.

11. The method of claim 10,
   wherein the request is received at the proxy from a Common Information Model (CIM) application, and wherein the request is implemented via CIM classes; and
   wherein the traversing of the class hierarchy database is performed by a traversal application in a CIM Object Manager (CIMOM) of the proxy to determine all specific subclasses of a CIM superclass that has a specific class corresponding to the managed device.

12. A computer readable storage medium, wherein code stored in the computer readable storage medium when executed by a processor causes operations, the operations comprising:
   receiving a request implemented via at least one device independent class;
   traversing a class hierarchy database to determine at least one device specific class that corresponds to the at least one device independent class, wherein the class hierarchy database stores a class hierarchy and associations between classes;
   modifying the received request, wherein in the modified request the least one device independent class has been translated to the at least one device specific class;
   generating a device specific request in a device specific language; and
   sending the device specific request in the device specific language to a managed device, wherein
   (i) in the class hierarchy database, a first base class at a higher level in the class hierarchy is connected to a second base class and a third base class that are at a lower level in the class hierarchy, wherein the second and third base classes are connected via a base association;
   (ii) in the class hierarchy database, the second base class is connected to a first specific class that corresponds to the first base class, the third base class is connected to a second specific class that corresponds to the second base class, wherein the first specific class and the second specific class are connected by a specific association;
   (iii) in response to a request for specific association instances based on providing a source class corresponding to the second base class and a requested class corresponding to the third base class, deriving one class supported by the managed device via the specific association.

13. The computer readable storage medium of claim 12, the operations further comprising:
   mapping at least one device independent class attribute to at least one device specific class attribute in the modified request;
   mapping at least one device independent property to at least one device specific property in the modified request;
   generating the device specific request from the modified request, in response to mapping the at least one device independent class attribute and the at least one device independent property; and
   sending the device specific request to the managed device, wherein a proxy couples a plurality of hosts to a plurality of managed devices that includes the managed device.

14. The computer readable storage medium of claim 12, the operations further comprising:
   further modifying the received request to include at least one association between device specific classes in the class hierarchy.

15. The computer readable storage medium of claim 12, wherein the received request indicates the source class and the requested class, the operations further comprising:
   determining one specific association between a first device specific class that corresponds to the source class and a second device specific class that corresponds to the specific class, wherein the one specific association corresponds to the managed device.

16. The computer readable storage medium of claim 12, wherein the source class represents storage pools and the requested class represents storage volumes corresponding to a storage pool.

17. The computer readable storage medium of claim 12, wherein the received request indicates the source class and the base association, the operations further comprising:
   determining a first device specific class from the class hierarchy database, wherein the first device specific class has one specific association with a second device specific class that corresponds to the indicated source class, and wherein the one specific association corresponds to the base association.

18. The computer readable storage medium of claim 12, wherein the request is received from a Common Information Model application, and wherein the at least one device independent class is specified by a Common Information Model schema.

19. The computer readable storage medium of claim 12, wherein the request comprises a command that is part of an object oriented management schema for managing non-homogeneous devices in a network environment.

20. The computer readable storage medium of claim 19, wherein the management schema comprises the Common Information Model.

21. The computer readable storage medium of claim 12, wherein the managed device is coupled to a proxy, wherein the proxy is a computational device, and wherein the receiving, the traversing, the modifying and the generating are performed by the proxy.

22. The computer readable storage medium of claim 21,
wherein the request is received at the proxy from a Common Information Model (CIM) application, and wherein the request is implemented via CIM classes; and
wherein the traversing of the class hierarchy database is performed by a traversal application in a CIM Object Manager (CIMOM) of the proxy to determine all specific subclasses of a CIM superclass that has a specific class corresponding to the managed device.

23. A system for managing devices, the system comprising:
a memory;
a processor coupled to the memory, wherein the processor performs operations, the operations comprising:
receiving a request implemented via at least one device independent class;
traversing a class hierarchy database to determine at least one device specific class that corresponds to the at least one device independent class, wherein the class hierarchy database stores a class hierarchy and associations between classes;
modifying the received request, wherein in the modified request the least one device independent class has been translated to the at least one device specific class;
generating a device specific request in a device specific language; and
sending the device specific request in the device specific language to a managed device, wherein
(i) in the class hierarchy database, a first base class at a higher level in the class hierarchy is connected to a second base class and a third base class that are at a lower level in the class hierarchy, wherein the second and third base classes are connected via a base association;
(ii) in the class hierarchy database, the second base class is connected to a first specific class that corresponds to the first base class, the third base class is connected to a second specific class that corresponds to the second base class, wherein the first specific class and the second specific class are connected by a specific association;
(iii) in response to a request for specific association instances based on providing a source class corresponding to the second base class and a requested class corresponding to the third base class, deriving one class supported by the managed device via the specific association.

24. The system of claim 23, the operations further comprising:
mapping at least one device independent class attribute to at least one device specific class attribute in the modified request;
mapping at least one device independent property to at least one device specific property in the modified request;
generating the device specific request from the modified request, in response to mapping the at least one device independent class attribute and the at least one device independent property; and
sending the device specific request to the managed device, wherein a proxy couples a plurality of hosts to a plurality of managed devices that includes the managed device.

25. The system of claim 23, the operations further comprising:
further modifying the received request to include at least one association between device specific classes in the class hierarchy.

26. The system of claim 23, wherein the received request indicates the source class and the requested class, the operations further comprising:
determining one specific association between a first device specific class that corresponds to the source class and a second device specific class that corresponds to the specific class, wherein the one specific association corresponds to the managed device.

27. The system of claim 23, wherein the source class represents storage pools and the requested class represents storage volumes corresponding to a storage pool.

28. The system of claim 23, wherein the received request indicates the source class and the base association, the operations further comprising:
determining a first device specific class from the class hierarchy database, wherein the first device specific class has one specific association with a second device specific class that corresponds to the indicated source class, and wherein the one specific association corresponds to the base association.

29. The system of claim 23, wherein the request is received from a Common Information Model application, and wherein the at least one device independent class is specified by a Common Information Model schema.

30. The system of claim 23, wherein the request comprises a command that is part of an object oriented management schema for managing non-homogeneous devices in a network environment.

31. The system of claim 30, wherein the management schema comprises the Common Information Model.

32. The system of claim 23, wherein the managed device is coupled to a proxy, wherein the proxy is a computational device, and wherein the receiving, the traversing, the modifying and the generating are performed by the proxy.

33. The system of claim 32,
wherein the request is received at the proxy from a Common Information Model (CIM) application, and wherein the request is implemented via CIM classes; and
wherein the traversing of the class hierarchy database is performed by a traversal application in a CIM Object Manager (CIMOM) of the proxy to determine all specific subclasses of a CIM superclass that has a specific class corresponding to the managed device.

* * * * *

UNITED STATES PATENT AND TRADEMARK OFFICE
CERTIFICATE OF CORRECTION

PATENT NO. : 7,587,421 B2
APPLICATION NO. : 10/769684
DATED : September 8, 2009
INVENTOR(S) : Bonilla et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 670 days.

Signed and Sealed this

Twenty-first Day of September, 2010

David J. Kappos
*Director of the United States Patent and Trademark Office*